United States Patent [19]
Wireman et al.

[11] 3,975,126
[45] Aug. 17, 1976

[54] METHOD AND APPARATUS FOR FORMING MATERIAL HAVING A PREDEFINED CROSS-SECTION

[75] Inventors: Jack Wireman, Yorba Linda; Richard Elliott Kazares, Fountain Valley, both of Calif.

[73] Assignee: AMF Incorporated, White Plaines, N.Y.

[22] Filed: Aug. 28, 1974

[21] Appl. No.: 501,375

[52] U.S. Cl. .............................................. 425/141
[51] Int. Cl.² ........................................ B28B 17/00
[58] Field of Search ........... 425/140, 141, 325, 363, 425/223

[56] References Cited
UNITED STATES PATENTS

| | | | |
|---|---|---|---|
| 2,583,842 | 1/1952 | Hendrickson | 425/147 |
| 2,774,988 | 12/1956 | Stirn et al. | 425/223 |
| 2,974,364 | 3/1961 | Lambert et al. | 425/223 |
| 3,408,694 | 11/1968 | Matsuoka | 425/328 |
| 3,421,960 | 1/1969 | Arbit | 425/325 |
| 3,635,627 | 1/1972 | Palmer | 425/141 |
| 3,734,659 | 5/1973 | Harris | 425/145 |

*Primary Examiner*—James L. Jones, Jr.
*Attorney, Agent, or Firm*—George W. Price; Martin Smolowitz

[57] ABSTRACT

A method and apparatus for controlling the amount of extruded material being formed from rubber stock into a continuous ribbon for deposition upon a tire body during the retreading operation. The mass flow rate of the extruded product is controlled by a sensing apparatus which is connected to a motor governing the advance of such rubber stock through a pair of specially shaped rollers at the discharge end of the extruding apparatus. The ability to control the throughput of material provides the tire surface with layers of material exhibiting favorable characteristics.

10 Claims, 3 Drawing Figures

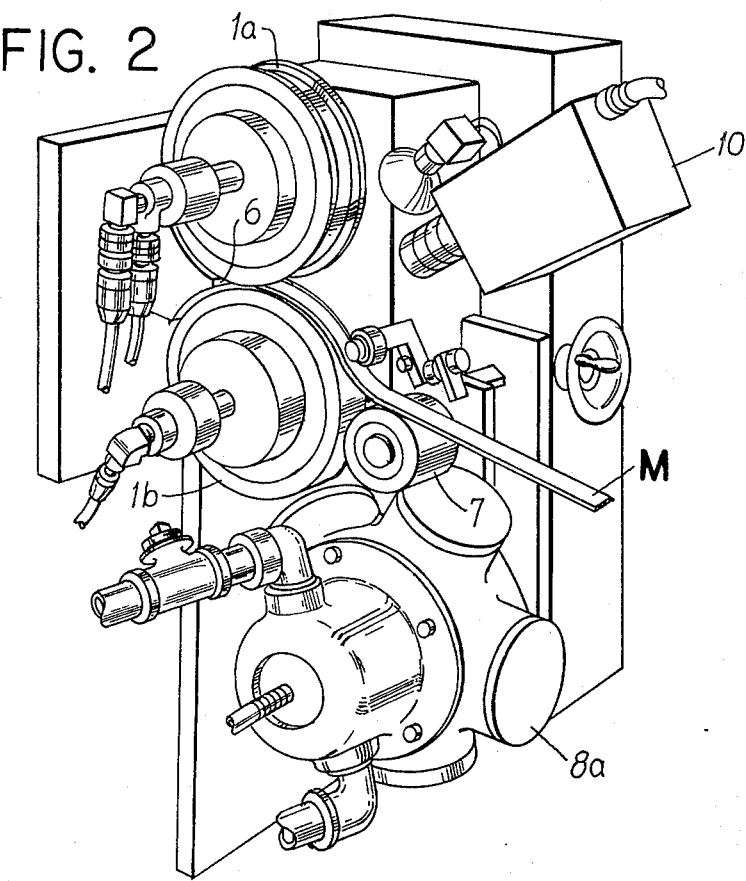
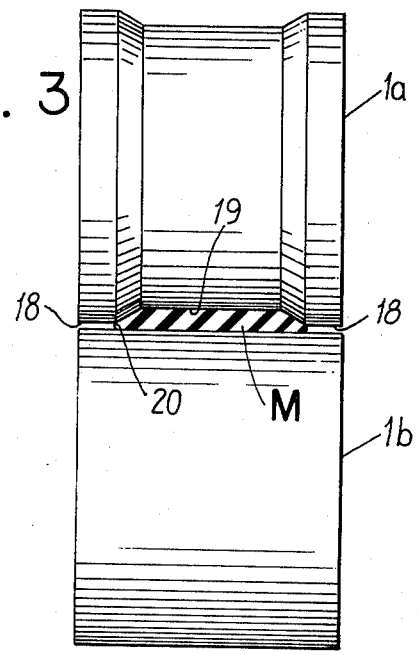

METHOD AND APPARATUS FOR FORMING MATERIAL HAVING A PREDEFINED CROSS-SECTION

The present invention is directed to a method and apparatus for depositing a layer of elastomeric material upon a surface. More particularly, the present invention is directed to a new and novel method and apparatus for introducing and extruding a predefined shape of elastomeric material.

It is well known that in an extrusion operation, the efficiency of the overall operation is in great part determined by control over the extruded shape as it exits from the die. In addition, the ability to control the mass flow rate of material worked upon vis-a-vis extruded material, is quite important in maintaining continuity and control over the entire operation. Up until the present invention, the ability to successfully effectuate mass flow control consistent with high rates of through-put has not been satisfactorily achieved.

Accordingly, it is the main object of the present invention to overcome the defects of the prior art.

It is still another object of the present invention to provide a apparatus for controlling the mass flow rate of product being extruded while simultaneously therewith producing a predefined extruded shape of high quality.

Still another object of the present invention is to provide a method of controlling the mass flow rate of material being processed.

Still another object of the present invention is to provide a control system for synchronizing the movement of constituent being extruded with that of the raw material being processed.

Still other objects and advantages of the present invention will be more fully understood with respect to the accompanying drawings and specification, as well as the appended claims.

In defining the operating parameters for controlling the rate of extrusion, as well as, contour of such extruded material, a number of physical and characteristic factors have to be carefully studied. For an example, the temperature at which such extruded material is being produced obviously effects flow rate. In turn, such flow rate has a direct bearing upon the performance of the dies. An over-riding factor in defining such characteristics is the ability to extrude a defined shape of constant dimension such that when placed upon the surfaces to be treated, the deposition can take place at rates which do not economically over-rule such operation.

For purposes of more precise illustration of the present invention, the method and apparatus will be defined in terms of the surfacing of a prepared tire surface or substrate. In this type of operation, it is assumed but not limited to, method consisting of the extrusion of a relatively small rubber strip of approximately 1 to 3 inches wide in an automatically controlled and programmed overlapping wrap operation. The small size of the rubber wrap is, in this example dictated by the necessity of obtaining a uniform surface regardless of the amount of strip overlapped. Inherent in this entire operation, is the need of accurate and repeatable ribbon control of constant dimensions and relatively small size. The reason for this is that generally the smaller the size of the ribbon, the more uniform the finished wrapped surfaces, i.e. tire surface. However, this characteristic is contrary to the operational features of existing extruders of elastomeric materials. Simply said, as the die size is reduced, the temperature of the extruded material is increased and in turn quality is decreased. In day to day operation, there is a balance between these two requirements. However, the result of such attempted balance is to be found in slow extrusion rates with certain classes of materials, i.e. natural rubber, primarily due to poor extrusion characteristics through narrow die openings. However, once the size of the die opening is increased and the ribbon dimensions are increased, there results a tire build-up which is not optimum.

In accordance with the invention, it is possible to independently control extruder performance characteristics as mentioned hereinandabove, from the requirement of small ribbon dimensions. Hence, the dynamic characteristics of a conventional extruder as employed in die systems have been significantly altered. For an example, in order to control ribbon dimensions with conventional means, it is quite apparent that with fixed dies, the width of the ribbon is virtually constant; whereas, the thickness can vary over a prescribed range. However, with the present invention, that is with a roller die, the ribbon thickness is constant due to exact thru-put syncronization, and the width can vary as a function of extruder operating conditions. It follows, that this factor has necessitated the need to monitor and control the width of ribbon for the roller die. With this possibility, the class of material, as well as other factors, such as extruder characteristics are minimized and, in fact, the problem of producing a quality thin ribbon for a fixed die is eliminated or substantially reduced by means of the present invention. The present invention, employs significantly lower than usual head pressures with the result that the tendency for the extruded material to surge and/or produce a rough and undesirable product, represent factors no longer to be concerned with. Lastly, the usual fixed die factors resulting in differential swelling as a function of ribbon thickness are substantially reduced.

By way of background the invention contemplates a method and an apparatus in which the die extrusion apparatus is not constrained to function in a manner that couples it to the production of a small thin ribbon. As part of the concept for overcoming the prior art shortcomings, the die unit employs two cooperating, predefined, operationally controlled, and temperature controlled rollers to squeeze an oval extruded shaped ribbon which is formed by a large orificed nozzle, into the required ribbon dimensions. By means of this approach, it is possible to obtain through-put rates at temperatures approaching open discharge extruder conditions. The invention contemplates employing a series of control elements for governing mass flow rates and the associated operating characteristics.

The invention will be best understood with respect to the following description, appended claims and drawings.

IN THE DRAWINGS

FIG. 2 is a partial perspective view of the invention showing the roller array, nozzle and scanning camera;

Figure 1:
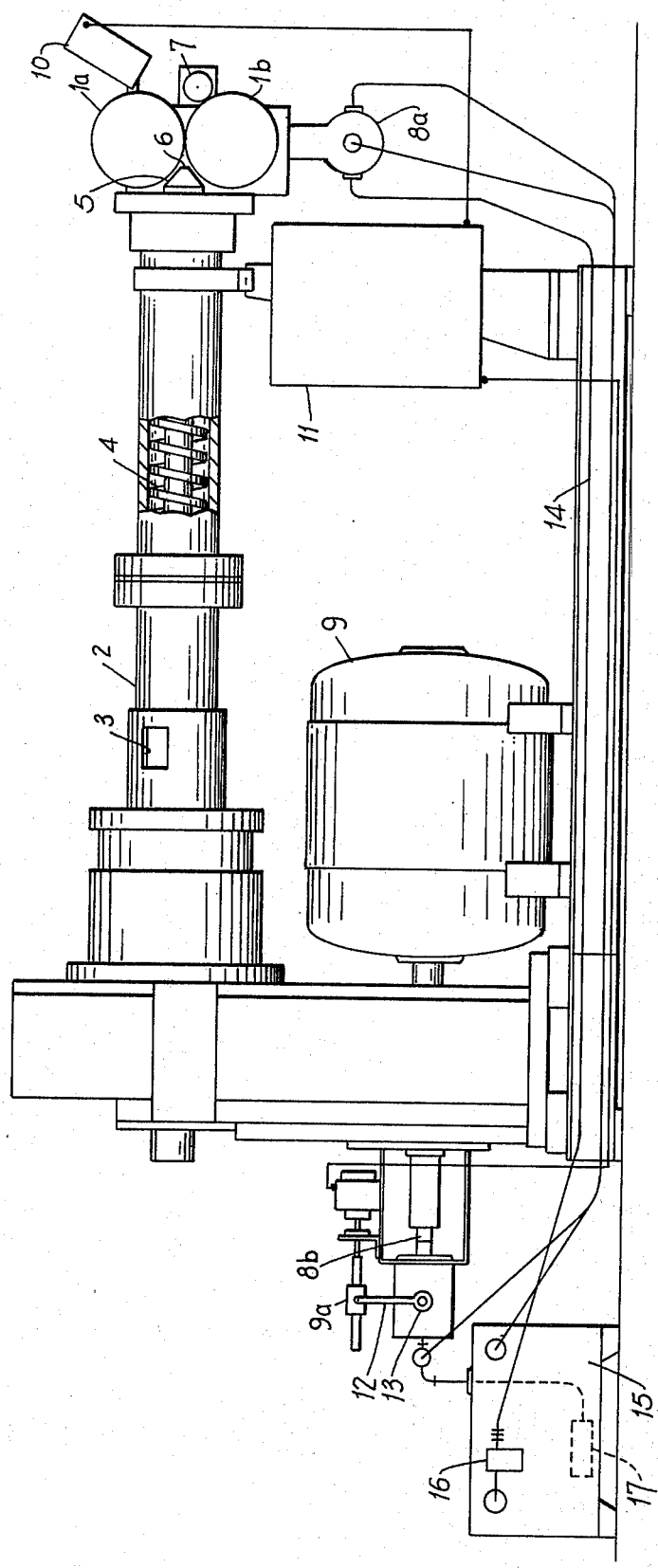
FIG. 1 is a side elevational view of the invention in conjunction with an extruding apparatus.

FIG. 3 illustrates a roller configuration in partial cross-section as employed in the present invention. In accordance with apparatus 1 of the present invention, FIG. 1, an extruder 2 of the conventional type having an input port 3 for receiving a continuous length of elastomeric material is employed, which under the urging of a screw 4 is caused to be worked and advanced through a point of exit 5 for engagement with the roller apparatus 1a, 1b, 7 of the present invention. Once such material exits, it is engaged by a roller die system (see FIG. 2) consisting of two powered counter rotating rollers 1a, 1b disposed in front of a large orifice die nozzle 6. The die nozzle 6 is attached directly to the discharge opening of the extruder 2. The contouring of the rollers 1a, 1b dictates the cross-sectional shape of the extruded material. A third powered roller 7 in proximity to the first two rollers 1a, 1b acts as a ribbon stripper. The disposition of this roller 7 in proximity to one of the die rollers 1b is such that by rotating in a direction opposite to that of the die, it is possible to peel the ribbon M off the die roller 1a. Furthermore, by carefully controlling the temperature of the responsive rollers 1a, 1b independently of one another, it is possible to assure the adherence of the extruded ribbon to the desired roller. The rollers are driven in approximate synchronism with one another. A controlled power system 8 (electrical, mechanical, or hydraulic) is directly coupled to a drive motor 9 which governs the extruder 2.

As part of a closed loop control system for governing the relationship between input of material and deposition of extruded material upon a surface, the invention employs, as an example, electro-optical sensing device 10, such as a photo-diode array line scanning camera and associated hardware for monitoring the width of extruded ribbon. In this connection, it should be pointed out that the ribbon width is dependent upon the roller die 1a velocity and in turn is varied or controlled by controlling the hydraulic fluid flow rate, in the hydraulic power system. This system consists of a direct coupled pump, 8b, flow control, 9a and motor 8a. In operation, the output signal of the line scanner is fed into control system 11 which ultimately drives a mechanical link 12 that varies the position of the hydraulic pump displacement swashplate. In turn, the position of the pump swashplate 13 which affects pump displacement, determines the velocity of the roller die 1a. The thickness of the ribbon being extruded is set and remains within prescribed limits by varying the distance between the two die rollers 1a, 1b.

The actual structural configuration of the present system employs an extruder drive motor coupled to a variable displacement, digitally controlled hydraulic pump 8b. The pump is adapted to provide a controlled volume of fluid to the hydraulic motor 8a, which in turn powers the two die rollers 1a, 1b and a stripper roller 7. The pump 8b is also coupled to the drive motor, in order to maintain overall start-up and shut-off transient syncronization of the extruder screw 4 and roller dies 1a, 1b. In operation, as the elastomeric material is being shaped to a given dimension, it is caused to adhere to the lower roller 1b due to a controlled temperature differential between the two rollers 1a, 1b. The upper roller 1a is a shaped roller in this case, which is held to a temperature of at least 30° hotter than the lower roller 1b by circulating fluid (water) through the interior of the rollers 1a, 1b. Such water can be obtained from the basic extruder temperature control units. The aforementioned takes place, since particular elastomeric materials M will adhere to the colder of the two rollers 1b. For reverse acting materials the zones may be reversed. In turn, the extruded material M is removed from the lower roller 1b by the stripper roller 7 which is rotating at the same or slightly higher surface velocity as the die roller 1a. The hydraulic power system employs conventional equipment, such as hydraulic line 14, tank 15, strainer 17 and filter 16.

The overall control is specifically designed to maintain the width of material M being extruded within a described value. This follows from the fact that the roller dies 1a, 1b are mass flow synchronized to the extruder 2 and for any instant of time, the roller dies 1a, 1b are designed to operate at the exact extruder mass flow rate. From this it follows that, if the instantaneous mass flow rate of the extruder were to change, the roller die rotational velocity must also change in a corresponding fashion so as to maintain the new flow rate. This, in turn is assured by controlling the roller die RPM as a function of ribbon width extruded material M. To achieve this operational relationship, a control system is employed which compares digitally the width of ribbon being extruded with that of a preselected value. Thereafter, the digital difference in the form of counts is converted to digital pulses which directly affects the displacement control of the hydraulic pump which in turn governs the roller die drive motor.

More particularly, the control system of the present invention is designed to maintain extruded ribbon volume to tolerances of within 1%. The system consists of a non-contacting electro-optical sensor 10 that continuously scans the width of the extruded ribbon. In operation, the measured width is digitally compared to a preselected value and a difference signal, if present, will cause a user selectable number of pulses to be transmitted to a DC stepper motor. The stepper motor, in turn, causes the output flow of a variable-displacement hydraulic pump to change a programmed amount. This change effects the instantaneous velocity of the die rollers 1a, 1b which results in the correction of ribbon width. Ribbon thickness M does not vary by more than ± 0.0005 inches (0.00127 cm). Thus the ribbon cross sectional area can be maintained to the tolerances specified.

The principle of operation of the invention, namely, the synchronization of the extruder thru-put rate and the roller die thru-put rate necessitates that the roller die rotational rate as a function of measured ribbon width be controlled; with the result that thickness does not substantially vary. The aforementioned is accomplished thru the use of the inventive control system.

Control is provided by optically scanning the extruded ribbon width thru the use of a diode array line scanning camera 10. The camera electronically scans the full width of the lower die roller 1b and the diode array provides resolution of approximately 0.025 inches (0.063 cm). A scan rate of approximately 1000 full scans per second is used. The control function is activated after each ten (10) successive full scans, i.e., control is performed on an average of ten scans. This factor reduces the impact of any system noise, spurious data, or very minor, high frequency variations in ribbon width. The camera 10 operates by using the constrast between the reflective metal surface of the die roller 1a and the darker, dull finish of the extruded ribbon M. The number of dark sensing diodes is then compared to a preset value on a series of thumbwheel switch selectors.

The electronic comparitor (not shown) then performs several functions. These are:

1. Determine the level and sense of the error.

2. Determine the trend of the error by comparing the present and previous error signal.
3. Sends the user selected number of pulses to the stepper motor pump displacement control assembly.

In addition to the capability of selecting the number of control steps per diode of error, the response frequency of the stepper motor is also user selectable. The steps per diode and response frequency are set initially to obtain the "best" appearing ribbon width. The factors that affect the control function are stock, extruder, and velocity related. Once initially set they remain constant.

The specific accuracy of the control system is obtained due to the unique shape of the roller die nip (see FIG. 3) and response capability of the control system.

For illustrative purposes, if during the extrusion operation the mass flow rate of the extruder 4 were to increase slightly, because of feed rate or consistancy of raw material, the width of the extruded ribbon would increase proportionately if the rotational velocity of the rollers 1a, 1b were held constant. Furthermore, if the roller die nip N is considered as being volume dependent on roller RPM, what results is a situation in which the surface velocity of the rollers for a given time and a constant cross-section produces a particular volume of end material. In turn, if a larger volume were to be supplied to the rollers, die 1a, it would escape through the sides of the rollers, since the rollers are not and cannot be sealed at the sides. Furthermore, if the roller RPM were to be increased so that the volume increases to match the new flow rate, the ribbon width would remain constant. The roller RPM is increased by increasing the displacement flow control of the hydraulic pump. To maintain the necessary accuracy of control, the cross-sectional area of the two rollers 1a, 1b are so shaped (see FIG. 3) so as to allow control over the width of the ribbon to be accomplished at a relatively narrow edge section of the ribbon. The upper roller, or lower roller, is provided at each edge by a predetermined surface 18 and a intermediate recess 19 contiguous therewith, forming a width control point at 20. The shape of the die as in FIG. 3 allows any excess material being fed therethrough to be squeezed through the narrow edge clearances 18. The apparatus is so designed that in operation the rollers 1a, 1b change speed to maintain a nominal ribbon shape. If the reverse of the above example occurs, i.e. a lesser extruder flow rate, the rollers slow down and continue to maintain the desired shape and dimensions. Because of the cross-sectional shape of the ribbon, the major area, the mass, concentrates in the center section; however, the relatively slow time rate of change of the flow of extruded material and the high degree of response of the control system enables variation of mass flow rate and ribbon dimensions to be held to minimum values. It has been determined that ribbon thickness can be produced over a defined range by increasing or decreasing the distance between the rollers. Once determined, the ribbon thickness does not vary by more than 0.001 inches, due to the flow syncronizating method.

From the above, it is apparent that the aforementioned system for extruding and controlling the through-put and size of elastomeric ribbon may have broad application. The mass flow synchronization employing a closed loop control apparatus for governing the width and rotational velocity of the apparatus is not intended to specifically be limited to any size or shape of roller die. Furthermore, it is not intended to limit the scope of this application to small dimensional extruded ribbons. However, for purposes of illustration, and to better understand the invention, it is desirable to view the apparatus and overall system with respect to the application of cap and or base stocks to a surface such as a tire body with successive wraps of ribbon. In actual operation, it has been found that the performance of the method and the apparatus as hereinbefore defined provides extruded elastomeric material of a quality at least equal to that of a fixed die, or previous roller dies but at a higher through-put rates and at lower temperatures.

What is claimed:

1. An apparatus for extruding an elastomeric material from a source of supply of a predetermined cross-sectional shape including: means for receiving and working material from a source of supply into an extruder means having a material driving means disposed therein, causing said material to be urged to exit out of such extruder means via cooperatively acting nozzle means; a plurality of contra rotating synchronized rollers disposed in proximity to said nozzle means adapted to receive such elastomeric material exiting from said nozzle means; control means being provided with hydraulic pumping means in communication with said plurality of rollers and said extruder; motor means governed by said hydraulic pumping means for advancing said rollers in response to the through-put of said elastomeric material with respect to said extruder means and electro-optical sensing means adapted to sense upon the width of said elastomeric material exiting from said nozzle means in response to a predetermined standard, said electro-optical sensing means being connected to said hydraulic pump means whereby variations in elastomeric material width cause an electrical signal to be generated thereby governing the speed of said hydraulic motor means.

2. An apparatus as claimed in claim 1 wherein: said plurality of rollers are defined by first, second, and third contra rotating rollers in which said first and second rollers are adapted to shape the extruded material issuing from said nozzle means and said third roller adjacent to said second roller, serves to remove the shaped material from such roller.

3. An apparatus as claimed in claim 1 wherein: said plurality of rollers are caused to be driven in synchronism in respect to one another by chain driven motor means where such motor means is mechanically linked to a hydraulic pump connected to and governing the speed at which material is being extruded from said extruding means.

4. An apparatus as claimed in claim 2 wherein: the nip distance formed by the said first and second rollers is variable to thereby alter extruder material thickness passing therethrough.

5. An apparatus as claimed in claim 1 wherein: said plurality of rollers is temperature controlled whereby said elastomeric material being shaped is caused to adhere to one of said rollers due to a predefined temperature differential existing at the roller surfaces.

6. An apparatus as claimed in claim 2 wherein: said first roller is further defined as being an upper roller, said second roller being defined as a lower roller, said third roller being defined as a stripper roller, said elastomeric material issuing from said nozzle means being urged through the nip surface formed between said upper and lower roller means to thusly be shaped as it proceeds through such nip and is subsequently removed by the action of said stripper roller upon said lower roller.

7. An apparatus as claimed in claim 2 wherein: roller means are provided at each edge portion with pre-shaped surfaces extending along and into an intermediate recess portion being contiguous therewith, enabling the elastomeric material being acted upon by such roller means to be shaped in accordance with such roller configuration.

8. An apparatus as claimed in claim 2 wherein: said elastomeric material being advanced through said plurality of roller means is caused to adhere to a designated roller due to the existing temperature differential between such rollers.

9. An apparatus as claimed in claim 1 wherein: said electro-optical sensing device is caused to scan the width of elastomeric material being deposited in response to roller rotation velocity, whereby said scanning device is caused to impart a signal responsive to material width thereby urging hydraulic pump means displacement to vary in response thereto and thusly assure synchronization of thru-put rates of said extruder and said rollers.

10. An apparatus as claimed in claim 2 wherein: the edge portions of the respective upper and lower rollers are provided with a clearance space enabling the passage of any excess elastomeric material therethrough.

* * * * *